Aug. 14, 1956 A. H. McKINNEY 2,758,474
APPARATUS FOR MEASUREMENT OF LEVELS OF MATERIALS IN TANKS
Filed Feb. 16, 1953

*INVENTOR.*
ALFRED H. McKINNEY
BY
ATTORNEYS.

United States Patent Office 2,758,474
Patented Aug. 14, 1956

2,758,474

APPARATUS FOR MEASUREMENT OF LEVELS OF MATERIALS IN TANKS

Alfred H. McKinney, Chester, Pa.

Application February 16, 1953, Serial No. 336,964

5 Claims. (Cl. 73—313)

This invention relates to an apparatus for measuring quantities of materials in tanks such materials including liquids and sludges and solids of a relatively fluent type. In particular, the invention relates to the securing of accurate measurements, remote indication of measurements, and temperature compensation. This application is a continuation-in-part of my Patent No. 2,629,261, issued February 24, 1953.

Tank gauges used heretofore have had various shortcomings particularly in respect to giving accurate indications at points remote from the tanks. Furthermore, they have generally required calculations to be made from the directly measured values of level to compensate for temperatures, tank shapes, distortions of the tank due to head of material, etc.

One of the objects of the present invention is the provision of a tank gauge which may be calibrated so as to give direct readings irrespective of tank shapes and automatically corrected for tank distortions depending upon variation in liquid heads.

A further object of the invention is to provide means for compensating automatically for temperature changes so that direct readings may be obtained in terms of quantity of the material in the tank by weight or by volume reduced to a standard temperature.

A further object of the invention is to provide means for compensating automatically for temperature changes of a liquid within a tank which may take place independently of the temperature of the surrounding atmosphere.

Further objects of the invention relate to the provision of means for remote indication of the quantities of materials in tanks.

The attainment of the foregoing objects as well as other objects particularly relating to details of construction and operation of the apparatus will be apparent from the following description when read in conjunction with the accompanying drawings, in which.

Figure 1:
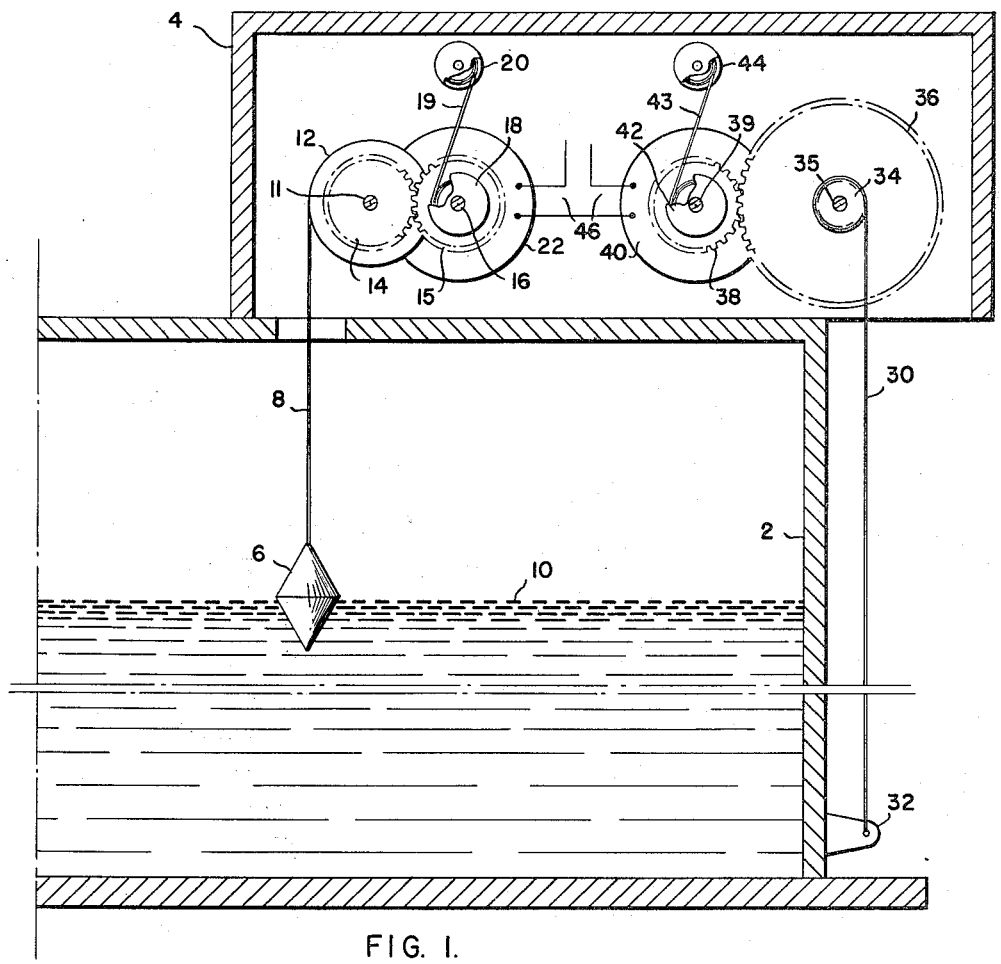
Figure 1 is an elevation partially in section showing the various mechanical parts associated with the tank for the purpose of making measurements.

In Figure 1 there is shown a tank 2 which may be open or closed at its upper end and carries mounted above its upper end an enclosure 4 within which there is contained the measuring apparatus.

A float 6 attached to a wire line 8 floats on the surface 10 of a liquid contained within the tank. The upper end of the wire line 8 is wound on a drum 12 mounted on a shaft 11. A gear 14 fixed on the shaft 11 is adapted to mesh with a gear 15 fixed on a shaft 16. A constant force spring tensioning device is shown at 18, 19 and 20 for maintaining a constant tension on the wire 8. The tensioning device 18–20 is a spring type motor such as that disclosed in the Patent No. 2,063,799 and of the type described in the September 1952 edition of the magazine "Instruments" on page 1278 thereof in which a spring strip 19 is wound on two spools 18 and 20 and urges the two spools to turn in predetermined directions. The tension thus produced serves to take up any backlash which may exist in the gears 14 and 15 and serves in conjunction with the liquid in the tank to buoy the float 6. It will be evident that various other types of tensioning devices may be employed in the place of the device described.

The movable element of a multiturn rheostat 22 is adapted to be rotated when the shaft 16 is rotated. Thus variations in liquid level in the tank will give rise to variations in the setting of the multiturn rheostat 22.

Figure 3:
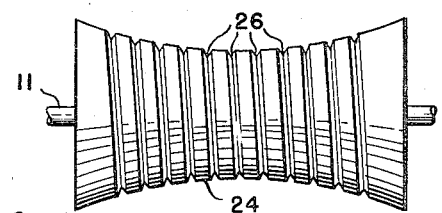
Figure 3 is an elevation illustrating a form of drum shown in Figure 1 and contoured to correspond with a particular tank shape.

The drum 12 on which the wire line 8 is wound may be cylindrical or may be contoured, as shown at 24 in Figure 3, and may carry grooves, as indicated at 26 in Figure 3, so that for any given movement of the wire 8 the angular rotation of the drum is such as to correspond to a definite quantity of liquid in the tank in terms of either volume or weight assuming the temperature to be constant. If a cylindrical tank were used having such rigidity that it would not suffer deformation to an appreciable degree due to variations of liquid head, the drum 12 would be cylindrical and the grooves in the drum be of constant depth. However, if the tank is of a type which is subject to deformation with different heads of liquid or is approximately but not accurately cylindrical interiorly, the grooves in the drum 12 would have to be suitably contoured for varying depth as indicated in connection with the drum 24 so that, still assuming the temperature constant, rotation of the drum 12 corresponding to different positions of the float 6, will constantly be directly proportional to the volume or weight of the liquid in the tank. The contouring of the drum here involved may be determined by calculation or empirically.

The float used when a single liquid is being measured may vary considerably in form but for sensitivity should have a considerable horizontal cross-sectional area so as to impose as large a torque as possible at the shaft of the drum 12 for a given vertical movement relative to the surface of the liquid. It may be noted here that while the torque exerted by the spring motor 18–20 at the shaft of the drum 12 is constant, the tension applied to the wire 8 will not be constant if the radius where the wire reaches the drum 12 varies for the length of the drum. The slight differences of the position of the float relative to the liquid surface resulting from this may be taken into account in contouring the drum groove but if the horizontal cross-section of the float is large and the torque applied by the spring leader 18–20 is small, the effect mentioned will be usually negligibly small. It is possible, by the use of the present apparatus, to detect reliably a change of liquid level which is a very small fraction of an inch.

In case it is desired to measure the interface between two liquids of different densities, the float would of course be such as to sink in the lighter liquid and float in the heavier when the motor torque is applied thereto.

From the foregoing, it will be evident that the output of the drum 12 and of the multiturn rheostat 20 in the form of angular rotation may be made proportionate to or at least to provide a definite function of the volume of liquid in the tank at a particular temperature.

A compensating wire 30 is mounted exteriorly of the tank. The lower end of the compensating wire is attached to a suitable bracket 32 affixed to the lower portion of the tank and the upper end of the wire 30 is wound around and affixed to a small drum 34 fixed on a shaft 35. Motion of the wire 30 with respect to the drum 34 causes the drum to rotate and, through a gear 36 fixed on the shaft 35 and a gear 38 in mesh therewith and fixed on the shaft 39, rotates the movable element of a rheostat 40 which is also affixed to the shaft 39. A constant spring tension spring motor 42, 43 and 44 similar to that described above is employed to provide a constant tension on the compensating wire 30 and to eliminate any backlash condition between the gears 36 and 38.

Temperature compensation involves a number of factors. First there must be considered the coefficient of volumetric expansion of the liquid (possibly in combination with solid material) in the tank. Secondly, there is involved the coefficient of linear expansion of the material (or materials) of the tank itself. Third, there must be considered the expansion of the float supporting wire 8. If the float supporting wire is selected to have substantially the same coefficient of expansion as the tank wall, the effect of this factor is minimized. To be correlated with these is the coefficient of linear expansion of the compensating wire 30. This wire, however, is preferably made of a material such as Invar providing no change of length with temperature and thus there is provided an absolute reference against which changes in overall tank height can be compared.

It will not be necessary in this specification to enter into a complete discussion of the mathematical proof that these various coefficients may be correlated to each other in such a fashion as to cause the output of the measuring apparatus contained within the enclosure 4 to be automatically corrected for variations of temperature so as to be substantially independent of temperature changes. This end may be attained to theoretically complete accuracy to the extent that the linear deformations with respect to temperature are involved. Second degree corrections are usually completely negligible but even if they do exist a mean linear type of correction will practically always give a sufficient approximation to the compensation desired.

It will be evident that the resistance of the rheostat 22 will be a function of the variation of liquid level. The resistance of the rheostat 40 at any particular time is a function of both the temperature of the liquid and of the air by reason of the fact that the change of tank height depends on both temperatures, the portion of the tank below the liquid level having substantially the temperature of the liquid, and that above the liquid level having substantially air temperature.

Briefly stated, the compensation is effected by so choosing the resistance values of the rheostats and the various gear ratios involved, and by so connecting the rheostats that, if a temperature change occurs without any change in quantity of the liquid, the total resistance provided by the rheostats 22 and 40 will remain unchanged, the compensation occurring due to the fact that a change in re-resistance of the rheostat 22 resulting from a rotation of the drum 12 (due to change in spacing of the tank top and the liquid level due to temperature change) would be compensated by a change in resistance of the rheostat 40 resulting from rotation of the drum 34 due to change of the tank height.

This may be accomplished if the resistances are arranged, for example, with the tank level resistance R22 increasing as liquid level increases and with the compensating resistance R40 decreasing as temperature of the tank wall increases, and if the resistances are so connected together that an addition to the liquid level resistance R22 adds to the total resistance presented by the two resistances and that an addition to the compensating resistance R40 adds to the total resistance of the two resistances. It will be evident that the degree of temperature response required will depend upon the differences between the coefficient of expansion of the liquid contained within the tank and the coefficient of expansion of the material of the tank itself.

Figure 2:
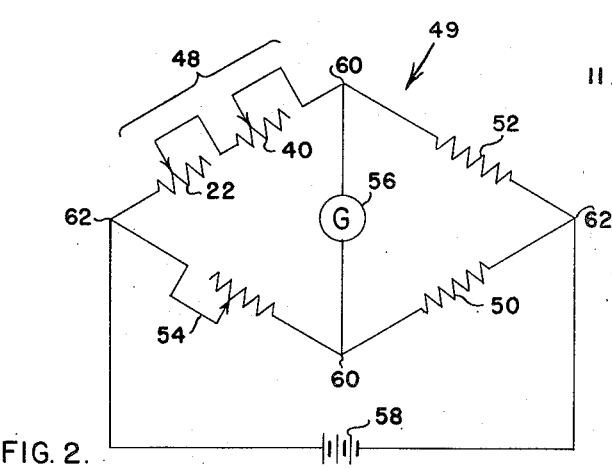
Figure 2 is an electrical diagram of the measuring circuit involved.

The rheostats 22 and 40 are connected in series by the wire lines 46 and the two rheostats form a leg 48 of a bridge circuit as indicated generally at 49 in Figure 2. This leg of the bridge circuit is responsive to liquid level and the temperature correction as has been described above. The opposite leg of the bridge circuit carries a resistance 50 which is selected in consideration of units of measurement desired, for example, gallons, pounds, etc. A third leg of the bridge carries a resistance 52 selected with regard to the value of the resistance 50 and specific for the particular tank involved, the resistance 52 being inversely proportional to the cross-sectional area of the tank. The fourth leg of the bridge carries a variable resistance 54 employed to balance the bridge in order to provide the conventional zero reading on a galvanometer 56 connected across the bridge at corners 60 between the legs carrying resistances 48 and 52 and the legs carrying resistances 50 and 54. A battery or other suitable supply 58 is connected across the opposite corners 62 of the bridge in the conventional fashion.

It will be evident that the variations in the settings of the rheostats 22 and 40 produced by variations in liquid level within the tank and by the action of a compensating wire 30 which remains of constant length while the top of the tank rises and falls with respect to the bottom of the tank as a result of tank temperature changes will serve to unbalance the bridge. The value of the resistance 54 required to balance the bridge will provide an accurate measure of the amount of liquid in pounds or gallons or other desired unit of measurement contained within the tank. The resistance 54 may be, for example, in the form of a rheostat including a dial calibrated to read directly the quantity of liquid contained within the tank in the units of measurement provided by particular resistance 50 selected.

It will be evident that numerous modifications may be made to the embodiment of the invention disclosed herein. For example, the compensating wire can be arranged to rotate the casing of the same rheostat which has a movable arm positioned by the operation of the float 6. Similarly, various torque applying mechanisms can be used in place of the spring motors illustrated. Furthermore, various other types of algebraic adding apparatus may be employed to combine the output indications of the float wire 8 and the external compensating wire 30. The bridge circuit described herein is, however, a particularly desirable form of indicating arrangement and it will be evident that the specific apparatus employed in the bridge circuit may be selected from numerous well known types of electrical apparatus.

The apparatus described lends itself readily to the provision of remote indication of liquid level having a high degree of accuracy and, when the electrical bridge system is used, it will readily be appreciated that a single bridge system having resistance balancing means 54 calibrated to provide a direct indication of liquid level may be employed in conjunction with a plurality of individual tanks and tank measuring apparatus by means of suitable electrical switching means well known to the art.

What is claimed is:

1. Apparatus for measuring the quantity of fluent material in a tank comprising a float, flexible supporting means for said float, a drum about which said flexible supporting means may be wound, means applying a torque to said drum urging it to wind up said flexible supporting means to maintain the float in a position of equilibrium in which it is partially submerged in a surface of said fluent material and partially supported by the buoyancy of said material, rotatable means movable in conformity with the position of said drum providing a value of resistance responsive to the level of the material in the tank, compensating means positioned externally of the tank providing a second value of resistance responsive to the temperature of the tank, and means electrically connected to the two resistances for providing an indication of the quantity of material in the tank.

2. Apparatus for measuring the quantity of fluent material in a tank comprising a float, flexible supporting means for said float, a drum about which said flexible supporting means may be wound, means applying a torque to said drum urging it to wind up said flexible supporting means to maintain the float in a position of equilibrium in which it is partially submerged in a surface of said fluent material and partially supported by the buoyancy of said material, rotatable means movable in conformity with the position of said drum providing a variable resistance responsive to the level of the material in the tank, compensating means positioned externally of the tank providing a value of resistance responsive to the temperature of the tank, and a bridge circuit including the two resistances in one leg thereof, and including in another leg thereof a variable resistance for balancing the bridge and indicating the quantity of the material in the tank.

3. Apparatus for measuring the quantity of fluent material in a tank comprising a float, flexible supporting means for said float, a drum about which said flexible supporting means may be wound, means applying a torque to said drum urging it to wind up said flexible supporting means to maintain the float in a position of equilibrium in which it is partially submerged in a surface of said fluent material and partially supported by the buoyancy of said material, rotatable means movable in conformity with the position of said drum, temperature compensating means positioned externally of the tank, said rotatable means and said temperature compensating means including means providing a value of resistance responsive to the level of the material in the tank and the temperature of the tank, and a bridge circuit including said value of resistance in one leg thereof, and including in another leg thereof a variable resistance for balancing the bridge and indicating the quantity of the material in the tank.

4. Apparatus for measuring the quantity of fluent material in a tank comprising an electrical bridge circuit, means responsive to the level of the material in the tank and means responsive to the temperature of the tank for providing in a first leg of the bridge circuit a value of resistance responsive to the level of the material in the tank and to the temperature of the tank, means providing in a second leg of the bridge circuit adjoining one end of said first leg a value of resistance specific for the tank, means providing in a third leg of the bridge circuit adjoining the other end of said first leg a value of resistance required for balancing the bridge and indicating the quantity of material in the tank, and means providing in the fourth leg of the bridge circuit a value of resistance selected to determine the units of measurement in which the quantity of the material in the tank is indicated.

5. Apparatus for measuring the quantity of fluent material in a tank comprising a float, flexible supporting means for said float, a drum about which said flexible supporting means may be wound, means applying a torque to said drum urging it to wind up said flexible supporting means to maintain the float in a position of equilibrium in which it is partially submerged in a surface of said fluent material and partially supported by the buoyancy of said material, rotatable means movable in conformity with the position of said drum including a variable resistance responsive to the level of the material in the tank, compensating means positioned externally of the tank including a variable resistance responsive to the temperature of the tank, and a bridge circuit including the two resistances in a first leg thereof, a resistance specific for said tank in a second leg thereof adjoining one end of said first leg, a resistance for balancing the bridge and indicating the quantity of material in the tank in a third leg thereof adjoining the other end of said first leg, and in the fourth leg a resistance having a value selected to determine the units of measurement in which the quantity of material in the tank is indicated.

References Cited in the file of this patent

UNITED STATES PATENTS

| | | |
|---|---|---|
| 1,188,793 | Kuludjian | June 27, 1916 |
| 1,375,131 | Cox | Apr. 19, 1921 |
| 1,483,131 | Tause | Feb. 12, 1924 |
| 1,522,355 | Winterhoff | Jan. 5, 1925 |
| 1,881,394 | Aull | Oct. 4, 1932 |
| 2,134,104 | Cressy | Oct. 25, 1938 |
| 2,273,850 | Ewald | Feb. 24, 1942 |
| 2,537,498 | Wickesser | Jan. 9, 1951 |
| 2,629,261 | McKinney | Feb. 24, 1953 |